United States Patent
Nakayama et al.

(10) Patent No.: US 10,702,985 B2
(45) Date of Patent: Jul. 7, 2020

(54) ROBOT

(71) Applicant: FANUC CORPORATION, Yamanashi (JP)

(72) Inventors: Kazutaka Nakayama, Yamanashi (JP); Kenichirou Abe, Yamanashi (JP); Masahiro Morioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 170 days.

(21) Appl. No.: 16/132,593

(22) Filed: Sep. 17, 2018

(65) Prior Publication Data
US 2019/0091854 A1 Mar. 28, 2019

(30) Foreign Application Priority Data

Sep. 28, 2017 (JP) ................ 2017-188123

(51) Int. Cl.
| | | |
|---|---|---|
| *B25J 9/08* | (2006.01) | |
| *B25J 9/00* | (2006.01) | |
| *B25J 9/04* | (2006.01) | |
| *F16M 3/00* | (2006.01) | |
| *B25J 5/00* | (2006.01) | |

(Continued)

(52) U.S. Cl.
CPC ............. *B25J 9/08* (2013.01); *B25J 5/007* (2013.01); *B25J 9/0009* (2013.01); *B25J 9/0024* (2013.01); *B25J 9/0027* (2013.01); *B25J 9/044* (2013.01); *F16M 3/00* (2013.01); *B25J 17/02* (2013.01); *B25J 18/04* (2013.01)

(58) Field of Classification Search
CPC . B25J 9/08; B25J 15/007; B25J 9/0009; B25J 9/0024; B25J 9/0027; F16M 3/00
See application file for complete search history.

(56) References Cited

U.S. PATENT DOCUMENTS

| | | | |
|---|---|---|---|
| 5,029,814 A | * | 7/1991 | Liegel ...................... B66F 3/22 254/122 |
| 5,876,173 A | | 3/1999 | English, Jr. |

(Continued)

FOREIGN PATENT DOCUMENTS

| | | |
|---|---|---|
| JP | S57-76612 U | 5/1982 |
| JP | S58-149201 U | 10/1983 |

(Continued)

OTHER PUBLICATIONS

Japanese Office Action dated Nov. 12, 2019, in connection with corresponding JP Application No. 2017-188123 (12 pgs., including machine-generated English translation).

(Continued)

*Primary Examiner* — David M Fenstermacher
(74) *Attorney, Agent, or Firm* — Maier & Maier, PLLC

(57) ABSTRACT

A robot including a base having a flat mounting surface section to be set on an installation surface by a fixing part, and also including a movable unit that is movable relative to the base. The base includes a tip-over prevention member that is disposed in a switchable manner between a state where the tip-over prevention member at least protrudes forward from the mounting surface section in a moving direction when a relocating process is performed and a state where the tip-over prevention member does not protrude forward from the mounting surface section.

6 Claims, 10 Drawing Sheets

(51) Int. Cl.
*B25J 17/02* (2006.01)
*B25J 18/04* (2006.01)

(56) References Cited

U.S. PATENT DOCUMENTS

| | | | |
|---|---|---|---|
| 8,657,306 B2* | 2/2014 | Chiu | B23Q 1/015 |
| | | | 280/43.1 |
| 10,399,226 B2* | 9/2019 | Ho | B25J 17/0258 |
| 10,584,733 B2* | 3/2020 | Nakayama | B25J 5/007 |
| 2003/0165378 A1 | 9/2003 | Lavitsky et al. | |
| 2019/0091855 A1 | 3/2019 | Nakayama et al. | |
| 2019/0093690 A1 | 3/2019 | Nakayama et al. | |

FOREIGN PATENT DOCUMENTS

| | | |
|---|---|---|
| JP | S61-154209 U | 9/1986 |
| JP | S61-165258 U | 10/1986 |
| JP | S62-20772 U | 2/1987 |
| JP | S62-88589 U | 6/1987 |
| JP | S64-019504 U | 1/1989 |
| JP | H06-196871 A | 7/1994 |
| JP | H08-11502 A | 1/1996 |
| JP | H09-207505 A | 8/1997 |
| JP | H11-278277 A | 10/1999 |
| JP | 2002-327553 A | 11/2002 |
| JP | 2004-020662 A | 1/2004 |
| JP | 2007-290096 A | 11/2007 |
| JP | 3155226 U | 11/2009 |
| JP | 2011-230214 A | 11/2011 |
| JP | 4820395 B2 | 11/2011 |
| JP | 2013-061053 A | 4/2013 |
| JP | 2019-063877 A | 4/2019 |
| JP | 2019-063878 A | 4/2019 |

OTHER PUBLICATIONS

Office Action dated Aug. 6, 2019, in corresponding Japanese Application No. 2017-188123; 9 pages.

Search Report dated Jul. 17, 2019, in corresponding Japanese Application No. 2017-188123; 25 pages.

* cited by examiner

ROBOT

CROSS-REFERENCE TO RELATED APPLICATIONS

This application is based on Japanese Patent Application No. 2017-188123, the content of which is incorporated herein by reference.

FIELD

The present invention relates to robots.

BACKGROUND

A known robot in the related art includes casters at the bottom of a base of the robot and an outrigger that causes the base to ascend and descend (for example, see Japanese Unexamined Utility Model Application, Publication No. Sho 62-20772).

When installing the robot according to Patent Literature 1, the base and the casters are raised by causing the outrigger to descend, such that the robot is supported by the outrigger. When relocating the robot, the outrigger is caused to ascend so that the weight of the entire robot is supported by the casters. In this state, the casters are caused to roll by applying a horizontal force to the robot, so that the robot can be moved in the horizontal direction.

SUMMARY

The present invention provides the following solutions.

An aspect of the present invention provides a robot including a base including a flat mounting surface section to be set on an installation surface by a fixing part; and a movable unit that is movable relative to the base, wherein the base includes a tip-over prevention member that is disposed in a switchable manner between a state where the tip-over prevention member at least protrudes forward from the mounting surface section in a moving direction when a relocating process is performed and a state where the tip-over prevention member does not protrude forward from the mounting surface section.

DETAILED DESCRIPTION

A robot 1 according to an embodiment of the present invention will be described below with reference to the drawings.

Figure 1:
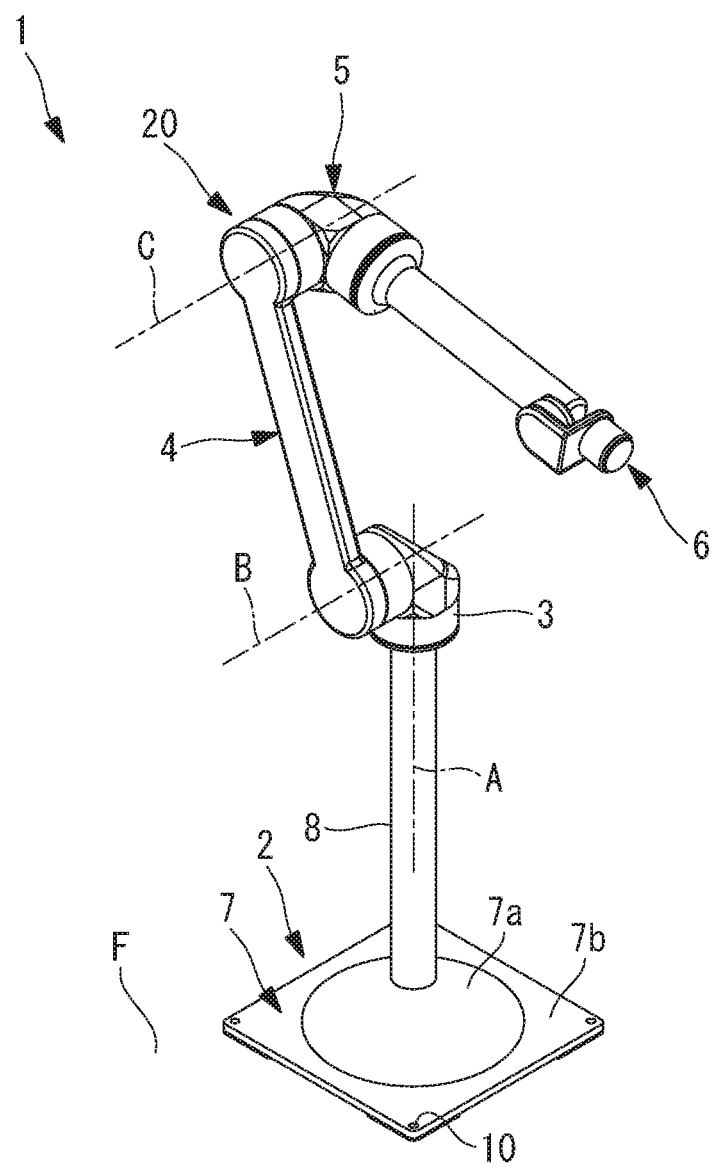
FIG. 1 is a perspective view illustrating a robot according to an embodiment of the present invention.

As shown in FIG. 1, the robot 1 according to this embodiment includes a base 2 set on a floor surface F (installation surface) and a movable unit 20 that is movable relative to the base 2.

The movable unit 20 is a six-axis vertical articulated robot including a rotating body 3 supported in a rotatable manner about a first axis A that is orthogonal to the base 2, a first arm 4 supported in a pivotable manner about a second axis B that is horizontal relative to the rotating body 3, a second arm 5 supported by the distal end of the first arm 4 in a pivotable manner about a third axis C that is parallel to the second axis B, and a triaxial wrist 6 disposed at the distal end of the second arm 5.

The base 2 includes a flat support leg section 7 (mounting surface section) extending along the floor surface F and substantially square-shaped in plan view, and also includes a columnar pillar 8 extending orthogonally upward from the center of the support leg section 7. The rotating body 3 is rotatably supported by the upper end of the pillar 8.

The support leg section 7 of the base 2 includes a truncated area 7a extending slightly upward from the center and a flat flange 7b extending horizontally from the outer periphery of the truncated area 7a. The flange 7b is substantially square-shaped in plan view and is provided with through-holes 9 (see FIG. 4) located at the four corners thereof and extending through the flange 7b in the thickness direction thereof. Each through-hole 9 has an inner diameter that allows an anchor bolt 10 (fixing part) to extend therethrough. By using the anchor bolts 10, the robot 1 can be fixed and set on the floor surface F.

The truncated area 7a of the base 2 is hollow at the bottom and accommodates therein a plurality of wheels 11 (friction reducing mechanism, see FIG. 3) that are movable into and out from the bottom surface of the support leg section 7 and an ascend-descend mechanism (not shown) that causes the wheels 11 to ascend and descend. The wheels 11 are supported in a rotatable manner about horizontal axes. The ascend-descend mechanism may be, for example, a mechanism that causes a plurality of wheels 11, for example, four wheels, to ascend and descend simultaneously by using a rack-and-pinion gear when a handle (not shown) provided on the pillar 8 is rotated.

Figure 2:
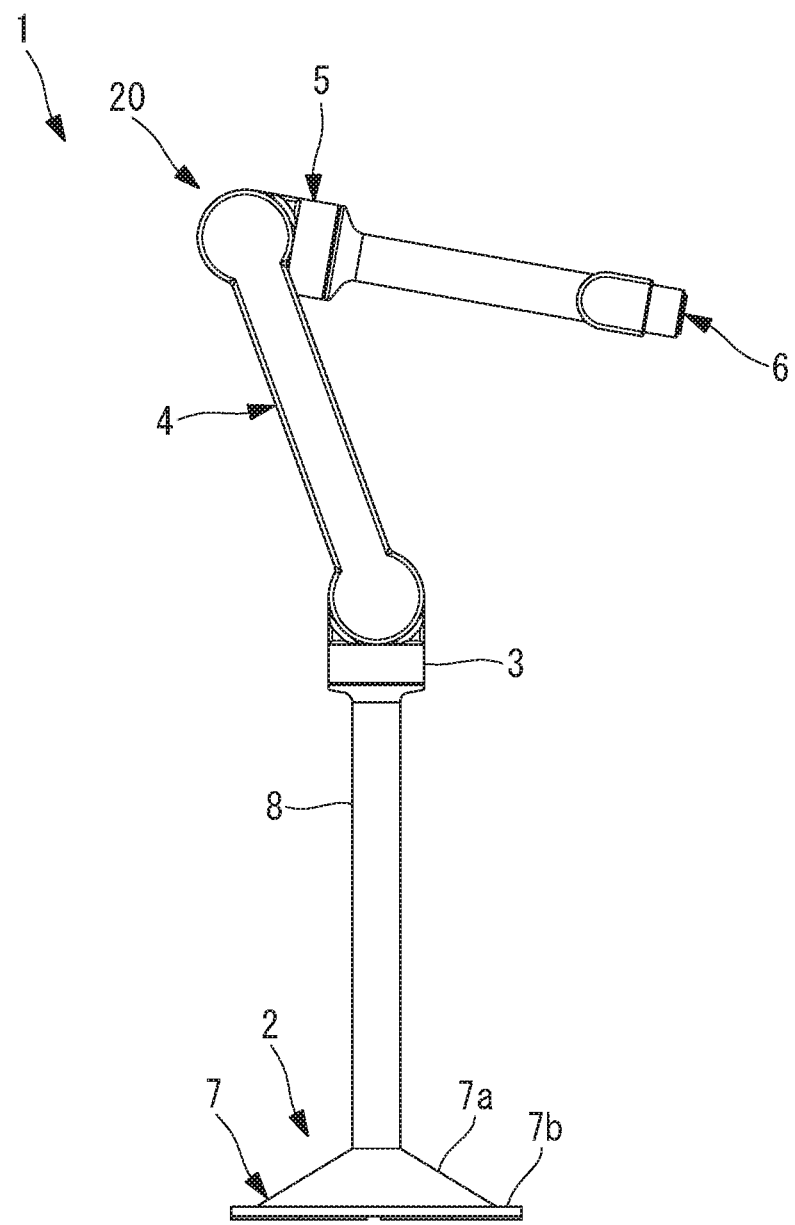
FIG. 2 is a side view of the robot in FIG. 1.
Figure 3:
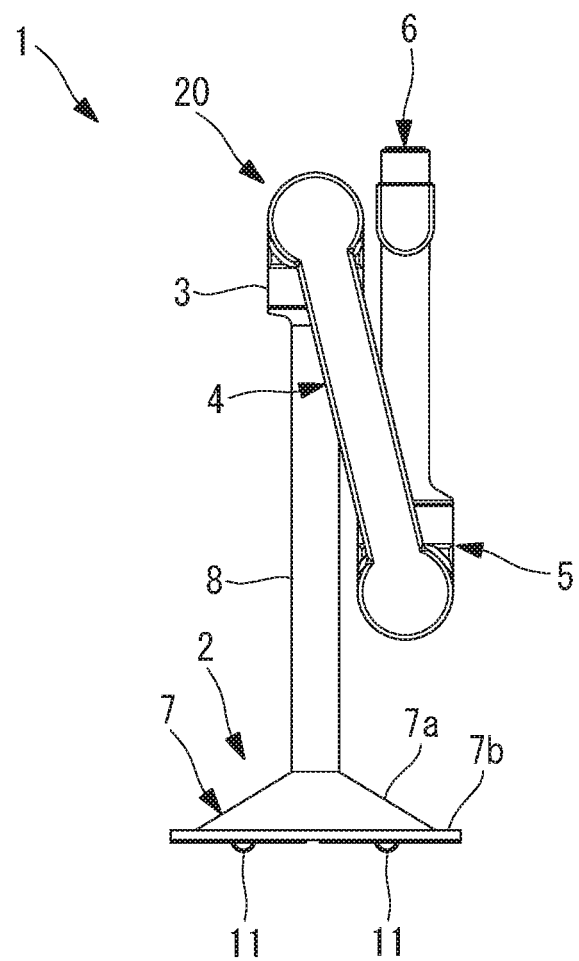
FIG. 3 is a side view illustrating the orientation of the robot in FIG. 1 at the time of a relocating process.

When fixing the support leg section 7 to the floor surface F, the ascend-descend mechanism is actuated to cause the wheels 11 to ascend, so that the wheels 11 are accommodated inside the truncated area 7a and thus do not protrude downward from the bottom surface of the support leg section 7, as shown in FIG. 2. When relocating the robot 1, the ascend-descend mechanism is actuated to cause the wheels 11 to descend, so that the wheels 11 protrude downward at least partially from the bottom surface of the support leg section 7, as shown in FIG. 3, thereby reducing the friction between the floor surface F and the flange 7b of the support leg section 7. The wheels 11 protruding downward from the bottom surface of the support leg section 7 support the flange 7b of the support leg section 7 in an ascended state from the floor surface F. When an operator applies a horizontal force to the robot 1, the wheels 11 rotate about horizontal axes and roll on the floor surface F, so that the robot 1 can be moved readily.

The support leg section 7 also includes tip-over prevention members 7c that are accommodated in the support leg section 7 when set on the floor surface F and that expand (protrude) to extend horizontally outward from the flange 7b when the robot 1 is to be relocated.

Figure 4:
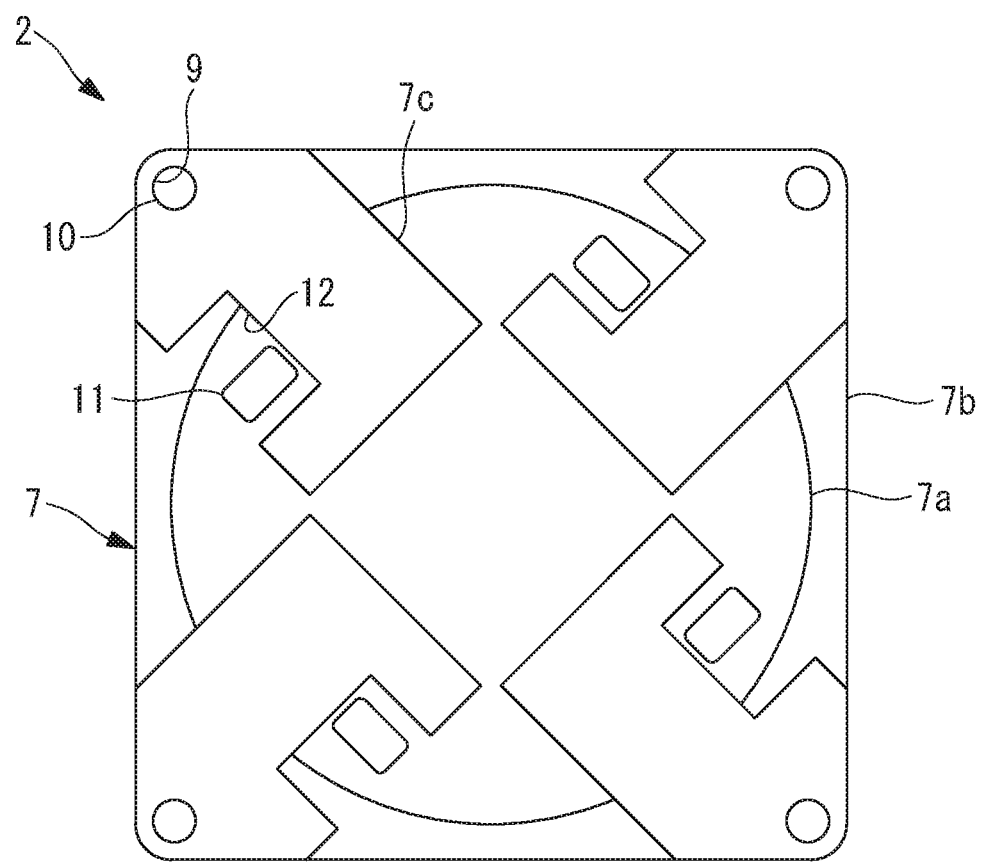
FIG. 4 is a bottom view of a support leg section of the robot in FIG. 1.
Figure 5:
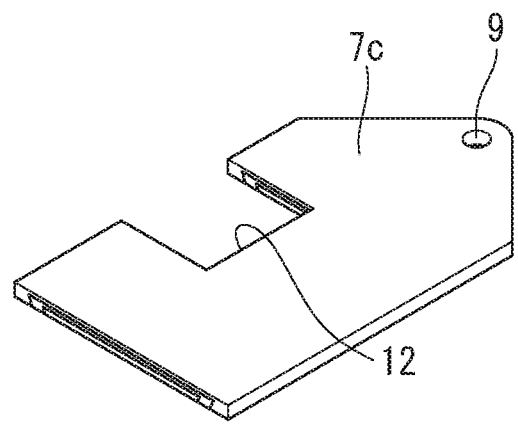
FIG. 5 is a perspective view illustrating an example of tip-over prevention members provided on a bottom surface of the support leg section of the robot in FIG. 4.
Figure 6:
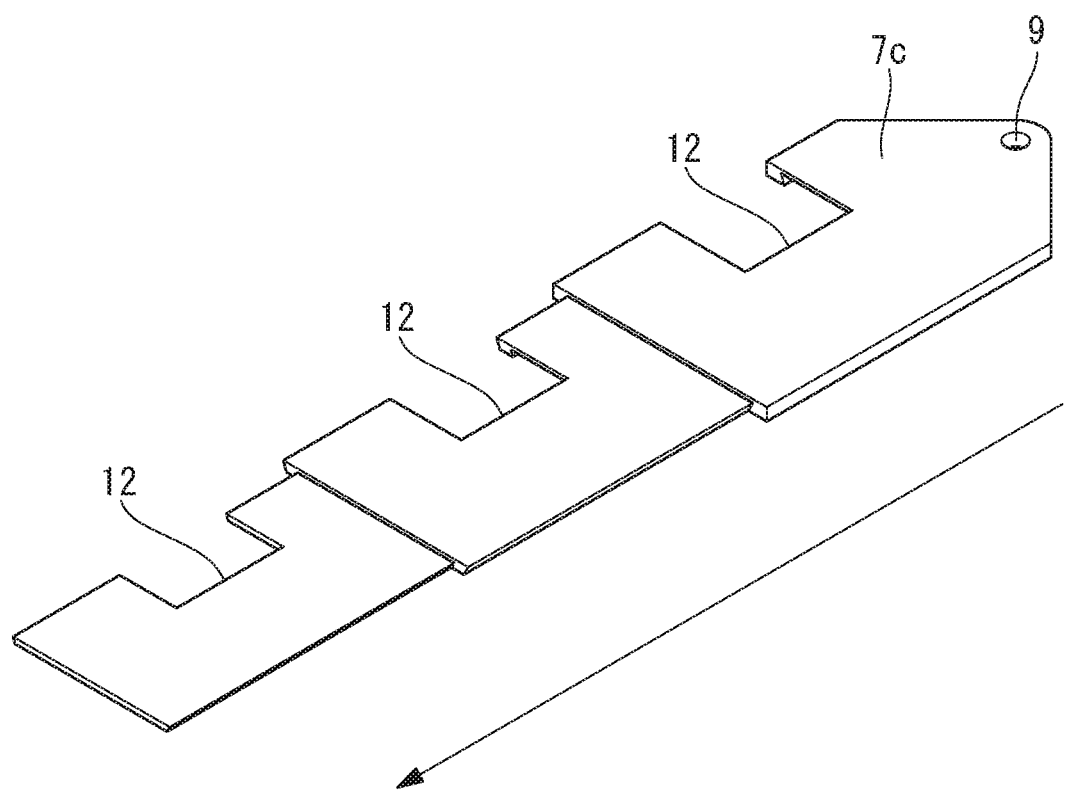
FIG. 6 is a perspective view illustrating a state where the tip-over prevention members in FIG. 5 are expanded.

As shown in FIG. 4, the tip-over prevention members 7c are four flat plates respectively attached to the four corners of the bottom surface of the flange 7b in a rotatable manner about the axes of the aforementioned four through-holes 9. As shown in FIGS. 5 and 6, each tip-over prevention member 7c is formed by telescopically combining three flat plate members in a fall-proof manner in accordance with an ant-like structure and can be switched between a retracted mode shown in FIG. 5 and an expanded mode shown in FIG. 6.

Figure 7:
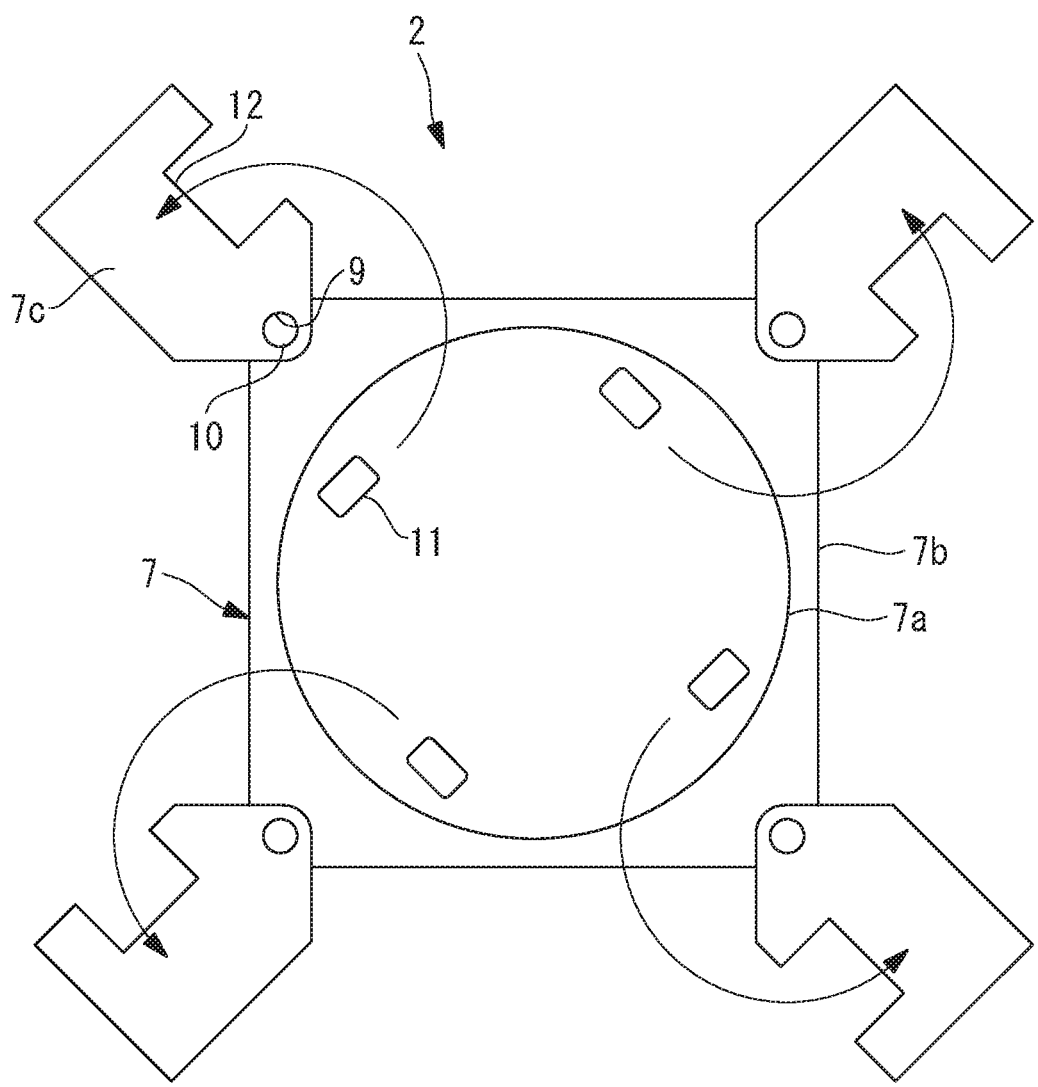
FIG. 7 is a bottom view illustrating a state where the tip-over prevention members in FIG. 5 are rotated so as to be arranged in a radial pattern.
Figure 8:
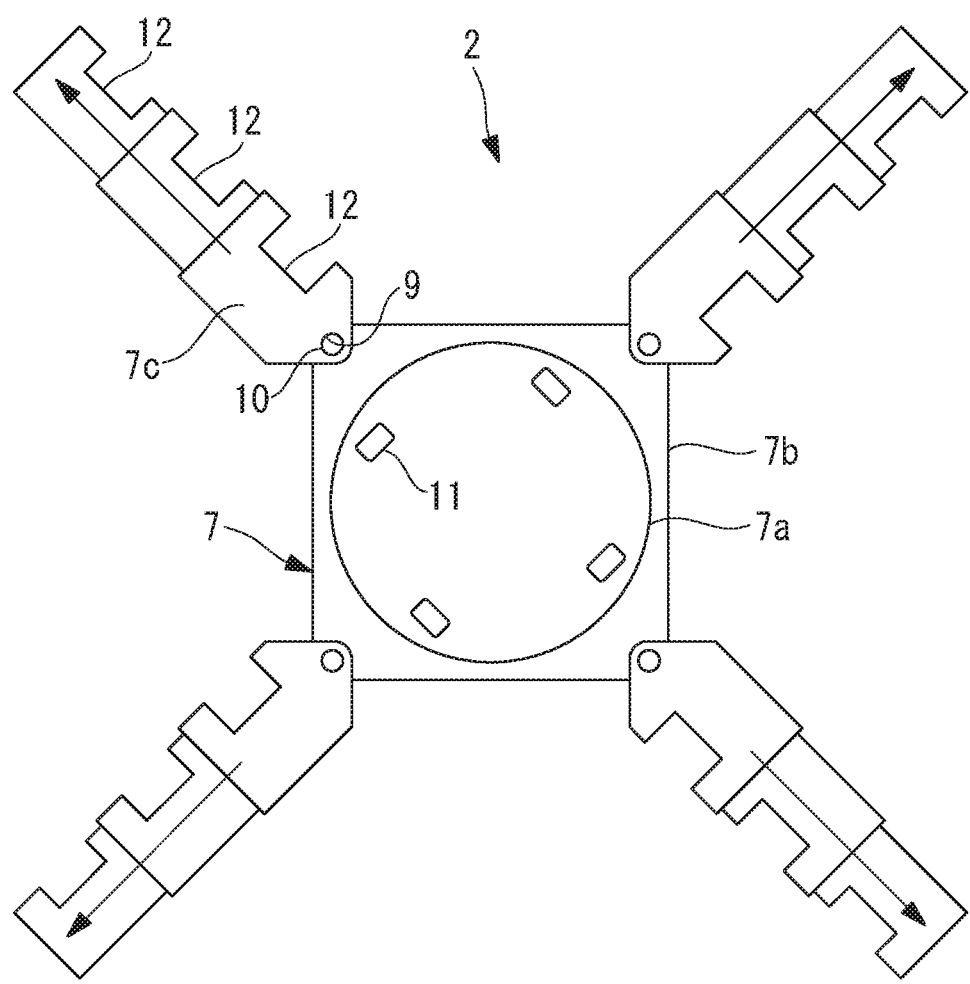
FIG. 8 is a bottom view illustrating a state where the tip-over prevention members are expanded from the state in FIG. 7.

As shown in FIGS. 5 and 6, the three flat plate members of each tip-over prevention member 7c are provided with cutouts 12 that are aligned with one another in the retracted mode. The cutouts 12 are provided at one side in the width direction of the flat plates constituting each tip-over prevention member 7c. Thus, as shown in FIG. 4, in a state where the tip-over prevention members 7c are accommodated under the flange 7b of the support leg section 7, the wheels 11 accommodated in the truncated area 7a of the support leg section 7 are disposed in the cutouts 12, so that ascending and descending of the wheels 11 are not hindered by the tip-over prevention members 7c. Moreover, in a state where the wheels 11 descend such that the support leg section 7 is raised from the floor surface F, the tip-over prevention members 7c are rotated without being hindered by the wheels 11, as shown in FIG. 7, and are expanded in a radial pattern, as shown in FIG. 8.

As shown in FIG. 1, the first arm 4 is offset relative to the pillar 8 in one radial direction and rotates along a plane disposed parallel to the longitudinal axis of the pillar 8 with a distance therebetween. The first arm 4 is set to be shorter than the pillar 8 of the base 2 and has a 360° operable range. The pillar 8 has a thickness (cross-sectional area) that is substantially equal to the thickness (cross-sectional area) of the first arm 4.

As shown in FIG. 1, the second arm 5 is offset by the same amount in the opposite direction from the direction in which the first arm 4 is offset relative to the pillar 8 and rotates along a plane including the longitudinal axis of the pillar 8. Thus, the central axis of the second arm 5 is disposed on the same plane as the central axis of the pillar 8.

The operation of the robot 1 according to this embodiment having the above-described configuration will be described below.

In order to use the robot 1 according to this embodiment, the support leg section 7 is set on the floor surface F with the wheels 11 and the tip-over prevention members 7c in an accommodated (stored) state such that they are nonfunctional, and the support leg section 7 is fixed to the floor surface F by using the anchor bolts 10 in the through-holes 9 at the four corners of the flange 7b. Thus, the robot 1 can operate as a floor-mounted six-axis vertical articulated robot.

In this case, in the robot 1 according to this embodiment, the base 2 is constituted of the flat support leg section 7 and the columnar pillar 8 extending orthogonally upward from the center of the support leg section 7, and the pillar 8 is longer than the first arm 4 and has a thickness equal to that of the first arm 4. This is advantageous in that the robot 1 can ensure a large workspace for the operator without occupying a large space.

Furthermore, since the rotating body 3 is disposed at the upper end of the pillar 8, which is long and narrow, and the pillar 8 is longer than the first arm 4, an operational mode similar to that of a suspended robot in which the first arm 4 is disposed lower than the second axis B can be achieved, in addition to the operational mode in which the first arm 4 is disposed higher than the second axis B, as shown in FIG. 1.

Figure 9:
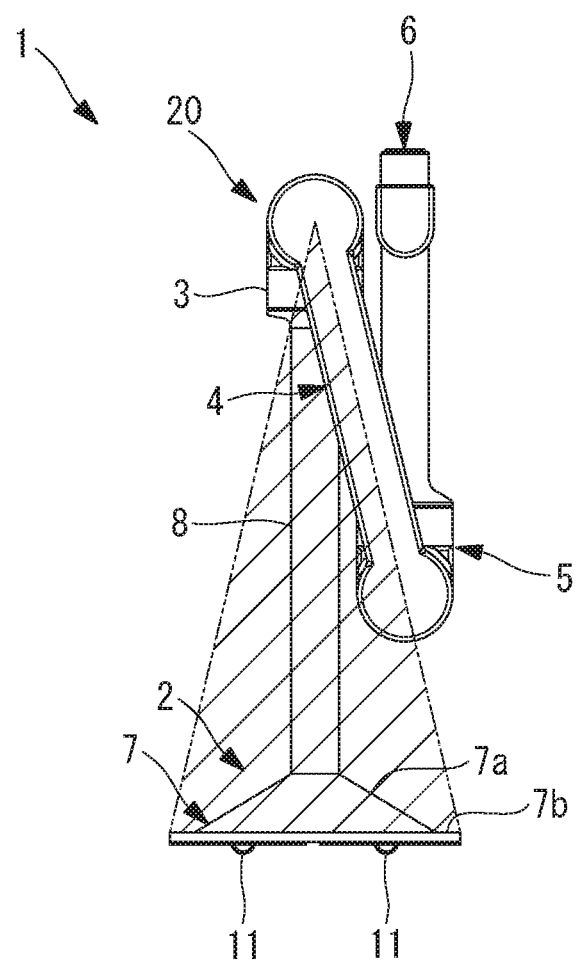
FIG. 9 is a side view for explaining the center of gravity in the orientation at the time of the relocating process in FIG. 3.

When relocating the robot 1, the first arm 4 and the second arm 5 are set in a folded state such that the second arm 5 extends along the pillar 8, as shown in FIG. 3, so that the overall center of gravity is set at a low position, thus making the robot 1 less likely to tip over. In this state, as shown in FIG. 9, the overall center of gravity is disposed within a pyramidal space (shaded area in FIG. 9) in which the support leg section 7 serves as a base, and an intersection point between a vertical line extending through the center of the support leg section 7 and a plane including the second axis B serves as an apex. Accordingly, when relocating the robot 1, the center of gravity is maintained so as not to be disposed outside the support leg section 7 even if the robot 1 tips to a certain extent, whereby the robot 1 is less likely to tip over.

Specifically, when relocating the robot 1, the power is cut off in a state where the robot 1 is folded as shown in FIG. 7, the anchor bolts 10 fixing the support leg section 7 to the floor surface F are removed, and the ascend-descend mechanism (not shown) is actuated so that the wheels 11 stored inside the truncated area 7a are caused to descend. Thus, the wheels 11 protrude downward from the bottom surface of the support leg section 7 so that the support leg section 7 is raised from the floor surface F. Consequently, the overall weight of the robot 1 is supported by the four wheels 11.

Figure 10:
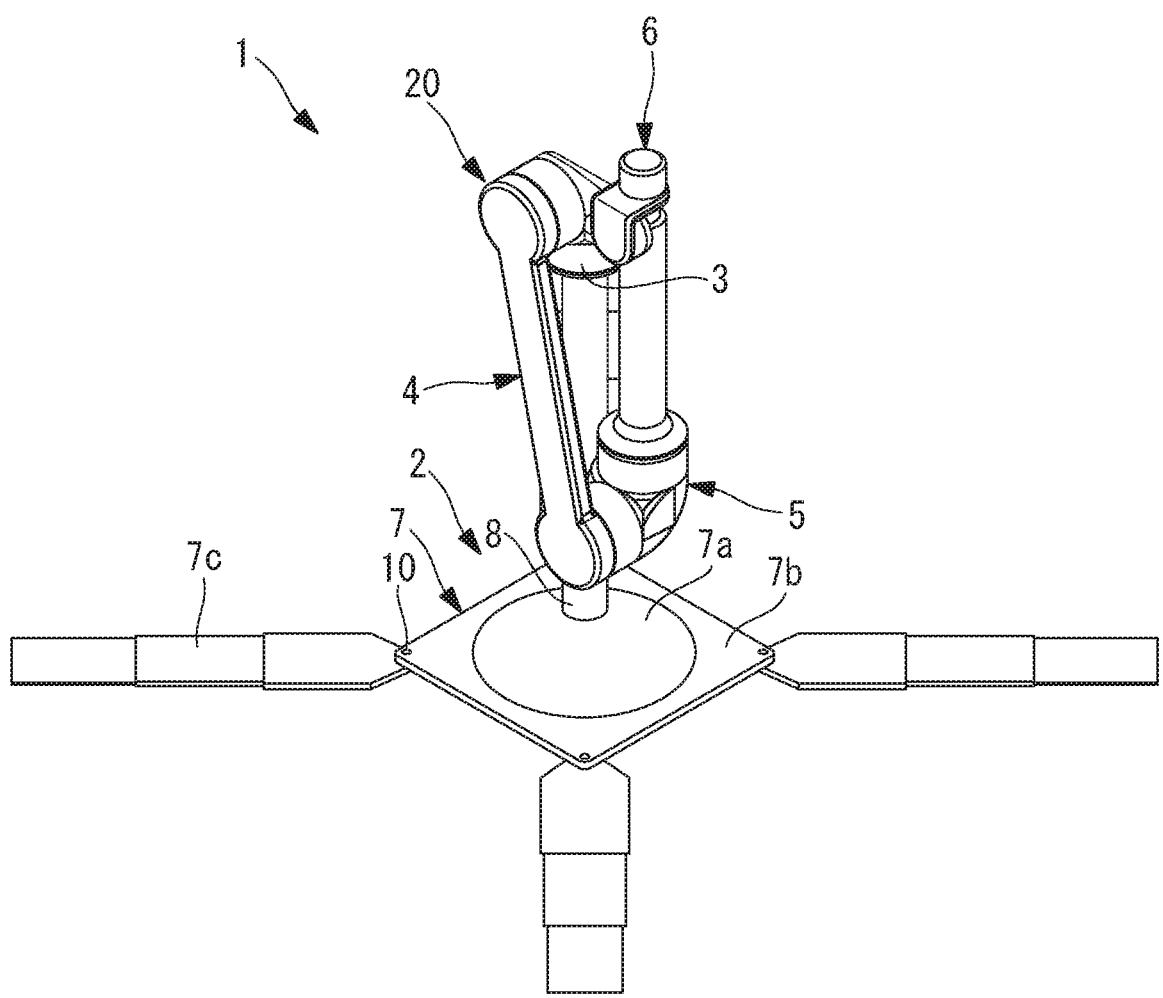
FIG. 10 is a perspective view illustrating the orientation at the time of the relocating process in FIG. 3.

In this state, the tip-over prevention members 7c are released from the state where they are interposed between the support leg section 7 and the floor surface F. Thus, as shown in FIG. 7, the tip-over prevention members 7c are rotated horizontally so as to be disposed in a radial pattern around the support leg section 7, and the three flat plate members constituting each tip-over prevention member 7c are expanded in the lengthwise direction, as shown in FIGS. 3, 8, and 10. Consequently, the four tip-over prevention members 7c are expanded in four directions in a radial pattern around the support leg section 7, which is advantageous in that the tip-over prevention effect can be further enhanced. In FIG. 10, the cutouts 12 of the tip-over prevention members 7c are not shown.

Then, in this state, the operator pushes against a side surface of the robot 1 by applying an external force thereto, so as to cause the wheels 11 to roll on the floor surface F, whereby the robot 1 can be readily moved in the direction in which the external force is applied. Because the support leg section 7 appears to be expanded in the horizontal direction owing to the four tip-over prevention members 7c extending radially around the support leg section 7, the robot 1 can be prevented from tipping over when being relocated.

Accordingly, in the robot 1 according to this embodiment, since the rotating body 3 is attached on the pillar 8 having a length larger than or equal to the length of the first arm 4 and having a thickness equal to the thickness of the first arm 4, the robot 1 is advantageous in that it is installable on the floor surface F while ensuring a large workspace for humans, similar to suspended robots. Moreover, in a state where the first arm 4 and the second arm 5 are folded, the overall center of gravity is disposed within the pyramidal space in which the support leg section 7 serves as the base, and the intersection point between the vertical line extending through the center of the support leg section 7 and the plane including the second axis B serves as the apex. This is advantageous in that the robot 1 is less likely to tip over when being relocated even if it is pushed from one side and is tilted, thereby achieving improved ease of relocation.

Furthermore, by expanding the tip-over prevention members 7c, the pyramidal space can be expanded in the horizontal direction, so that the tip-over prevention effect can be enhanced, thereby further improving the ease of relocation and safety.

Furthermore, with the robot 1 according to this embodiment, the entire robot 1 can be accommodated within a columnar space having the support leg section 7 as a base by folding the first arm 4 and the second arm 5. This is advantageous in that space is effectively utilized when a large number of robots 1 are arranged, stored, or transported.

Figure 11:
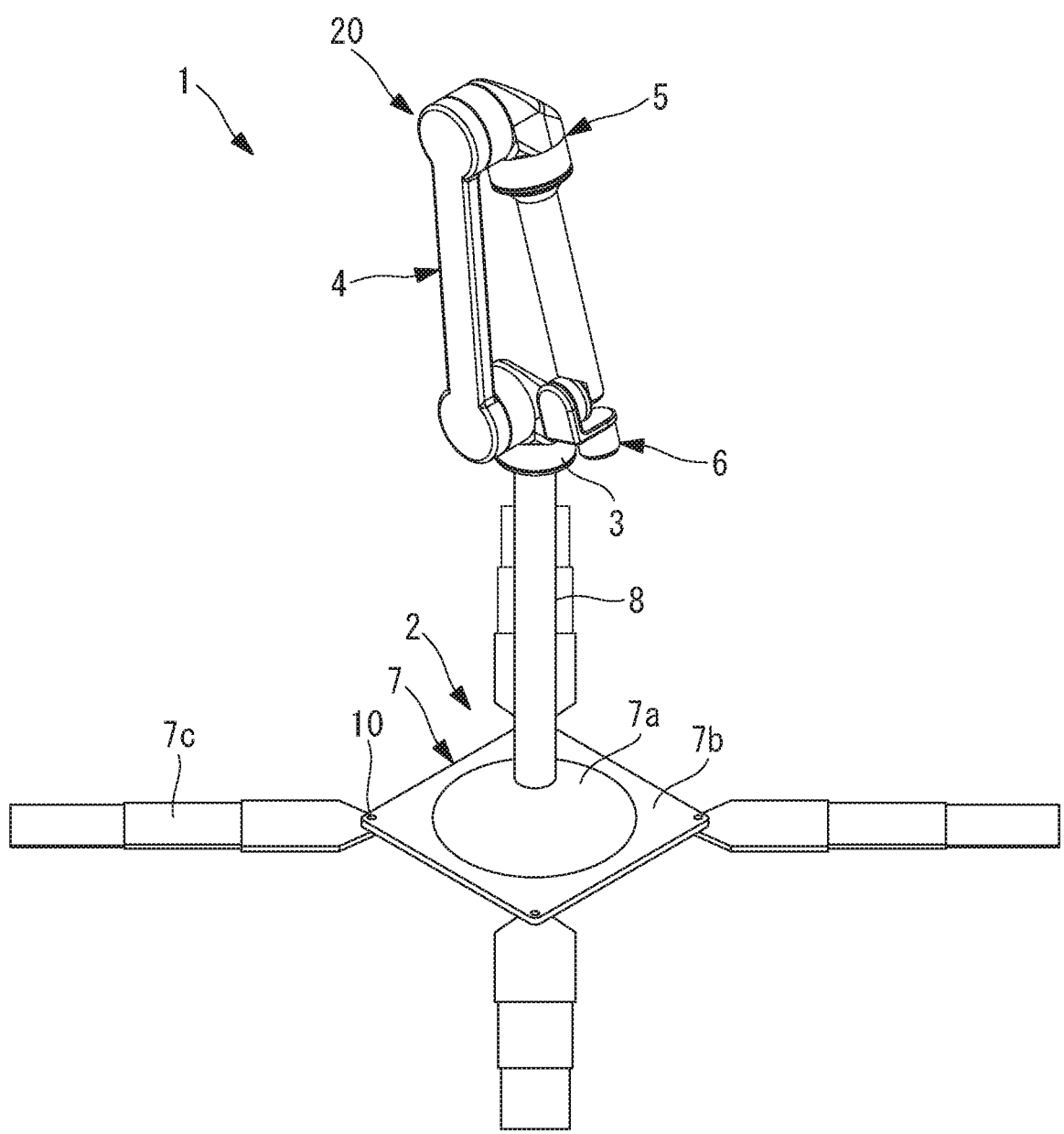
FIG. 11 is a perspective view illustrating an example of another orientation at the time of the relocating process of the robot in FIG. 1.

In this embodiment, the state where the first arm 4 and the second arm 5 are folded, as shown in FIG. 3, is described as being the orientation of the robot 1 during a relocating process thereof. Alternatively, by expanding the tip-over prevention members 7c, the relocating process may be performed in a state where the first arm 4 and the second arm 5 are disposed above the second axis B, as shown in FIG. 11, so that the robot 1 is less likely to tip over. In FIG. 11, the cutouts 12 of the tip-over prevention members 7c are not shown.

Furthermore, the pillar 8 of the base 2 may be expandable and retractable in the vertical direction. This is advantageous in that, by expanding the pillar 8, an operable range can be set such that the robot 1 can reach a higher position, and by retracting the pillar 8, the center of gravity of the robot 1 in its folded state can be set to a lower position.

In this embodiment, each tip-over prevention member 7c is formed by telescopically combining three flat plate members in an expandable-retractable manner. Alternatively, each tip-over prevention member 7c may be formed of a single flat plate member. Moreover, the tip-over prevention members 7c are rotatably attached to the support leg section 7 and are rotated at the time of a relocating process so as to protrude radially around the support leg section 7. Alternatively, the tip-over prevention members 7c may be detachably attached to the support leg section 7.

As an alternative to the floor surface F exemplified as the installation surface to which the support leg section 7 is to be fixed, the support leg section 7 may be set and fixed on another freely-chosen installation surface, such as an upper surface of a support base set on the floor surface F.

Moreover, the shape of the support leg section 7 is not limited to the substantially square shape in plan view and may alternatively be a freely-chosen shape.

This embodiment may be further provided with a rotation detector (not shown) that detects rotation of the wheels 11, an actuation detector (not shown) that detects whether or not the tip-over prevention members 7c are expanded, and a notifier (not shown) that gives an alarm when rotation of the wheels 11 is detected by the rotation detector in a state where expansion of the tip-over prevention members 7c is not detected by the actuation detector.

In this case, if the robot 1 is pushed horizontally in a state where the tip-over prevention members 7c are not expanded, the rotation detector detects rotation of the wheels 11 and the notifier gives an alarm. Thus, the operator performing the relocating process can recognize that the tip-over prevention members 7c are not in a protruding state, thereby preventing the relocating process from being performed in a state where the tip-over prevention measures are not taken.

In this embodiment, the wheels 11 are exemplified as a friction reducing mechanism. As an alternative to the wheels 11 that are rotated about horizontally-disposed shafts, cylindrical rollers or spherical balls whose central axes are horizontally disposed may be used. Furthermore, the friction reducing mechanism is not limited to wheels 11. A freely-chosen material that can reduce the friction between the floor surface F serving as the installation surface and the flange 7b of the support leg section 7 may be used. For example, a sheet or plate composed of resin having a low friction coefficient, such as polytetrafluoroethylene resin, may be bonded to the bottom surface of the flange 7b. In this case, the friction reducing member does not have to be movable into and out from the bottom surface.

In this embodiment, the tip-over prevention members 7c protrude radially from the four corners of the base 2 of the support leg section 7. Alternatively, the tip-over prevention members 7c may at least protrude forward in the moving direction at the time of the relocating process. Furthermore, in this embodiment, the tip-over prevention members 7c protrude outward from the support leg section 7 by being rotated horizontally. Alternatively, the tip-over prevention members 7c may be detachable from the support leg section 7, such that the tip-over prevention members 7c may be attached to the support leg section 7 at the time of the relocating process, where necessary, and at least protrude forward in the moving direction at the time of the relocating process.

In this embodiment, the movable unit 20 is described as being a six-axis vertical articulated robot including the rotating body 3 rotatable about the first axis A above the base 2, the first arm 4 disposed on the rotating body 3 and pivotable about the second axis B, the second arm 5 disposed at the distal end of the first arm 4 and pivotable about the third axis C, and the triaxial wrist 6 disposed at the distal end of the second arm 5. Alternatively, a robot with another freely-chosen axis configuration may be employed.

In the robot 1 described in this embodiment, the base 2 includes the support leg section 7 and the pillar 8. Alternatively, a robot with another freely-chosen structure may be employed.

As a result, the above-described embodiment leads to the following aspect.

An aspect of the present invention provides a robot including a base including a flat mounting surface section to be set on an installation surface by a fixing part; and a movable unit that is movable relative to the base, wherein the base includes a tip-over prevention member that is disposed in a switchable manner between a state where the tip-over prevention member at least protrudes forward from the mounting surface section in a moving direction when a relocating process is performed and a state where the tip-over prevention member does not protrude forward from the mounting surface section.

According to this aspect, when the robot is to be relocated, the tip-over prevention member is disposed so as to at least protrude forward from the mounting surface section in the moving direction when the relocating process is performed, whereby the mounting surface section appears to be larger. Thus, even if the base and the movable unit movable relative to the base are tilted during the relocating process, the overall center of gravity is maintained within the mounting surface section, so that the robot is less likely to tip over. After the relocating process, the mounting surface section is fixed to the installation surface by using the fixing part, so that the movable unit can be operated stably relative to the base. After the fixing process using the fixing part, the tip-over prevention member becomes unnecessary so that the tip-over prevention member is switched to the non-protruding state after the relocating process. Consequently, an increase in size of the installation space can be prevented, and the tip-over prevention member can be prevented from becoming a hindrance in the state where the robot is set on the installation surface.

In the above aspect, the tip-over prevention member may be detachable.

Accordingly, when the robot is to be relocated, the tip-over prevention member is attached so as to at least protrude forward from the mounting surface section in the moving direction when the relocating process is performed, whereby the robot is less likely to tip over. After the relocating process, the tip-over prevention member is detached so as to be switched to the non-protruding state. Consequently, an increase in size of the installation space can be prevented, and the tip-over prevention member can be prevented from becoming a hindrance in the state where the robot is set on the installation surface.

Furthermore, the above aspect further comprises a friction reducing mechanism that is provided in the mounting surface section and that reduces friction between a mounting surface of the mounting surface section and the installation surface during the relocating process.

Accordingly, when the relocating process is to be performed, the robot is simply pushed in the horizontal direction in a state where the base is released from the installation surface by the fixing part, so that the friction reducing mechanism reduces the friction between the mounting surface and the installation surface, whereby the robot can be moved readily. After the relocating process, the robot is fixed to the installation surface by the fixing part, so that the robot can be stably operated.

Furthermore, in the above aspect, the friction reducing mechanism may be stored in the mounting surface section so as to be movable into and out from the mounting surface of the mounting surface section, and may protrude from the mounting surface when the relocating process is performed.

Accordingly, when the relocating process is to be performed, the mounting surface section is released by the fixing part, and the friction reducing mechanism is subsequently caused to protrude downward from the mounting surface. Thus, by simply pushing the robot in the horizontal direction, the friction reducing mechanism reduces the friction between the mounting surface and the installation surface, whereby the robot can be moved readily. Then, the friction reducing mechanism is retracted upward relative to the mounting surface, so that the mounting surface of the mounting surface section is brought into contact with the installation surface of the relocation destination, whereby the mounting surface of the mounting surface section can be set and fixed again by using the fixing part.

Furthermore, in the above aspect, the friction reducing mechanism may be a wheel rotated about a horizontal axis.

Accordingly, during the relocating process, the weight of the entire robot is supported by the wheel protruding downward from the mounting surface. By simply rotating the wheel about the horizontal axis, the friction between the mounting surface and the installation surface is reduced, so that the robot can be moved readily.

Furthermore, the above aspect may further comprise a rotation detector that detects rotation of the wheel; an actuation detector that detects whether or not the tip-over prevention member is in a protruding state; and a notifier that gives an alarm when rotation of the wheel is detected by the rotation detector in a state where the protruding state of the tip-over prevention member is not detected by the actuation detector.

Accordingly, when the robot is pushed horizontally in a state where the tip-over prevention member is not protruding, the rotation of the wheel is detected by the rotation detector, and an alarm is given by the notifier. Consequently, the operator performing the relocating process can recognize that the tip-over prevention member is in a non-protruding state, thereby preventing the relocating process from being performed in a state where the tip-over prevention measures are not taken.

The present invention is advantageous in that it can achieve stable operation while also achieving improved ease of relocation.

REFERENCE SIGNS LIST 1 robot
2 base
7 support leg section (mounting surface section)
7c tip-over prevention member
10 anchor bolt (fixing part)
11 wheel (friction reducing mechanism)
20 movable unit
F floor surface (installation surface)

The invention claimed is:

1. A robot comprising:
    a base including a flat mounting surface section to be set on an installation surface by a fixing part; and
    a movable unit that is movable relative to the base; and
    a friction reducing mechanism that is stored in the mounting surface section so as to be movable into and out from a mounting surface of the mounting surface section, that protrudes from the mounting surface when a relocating process is performed, and that reduces friction between the mounting surface of the mounting surface section and the installation surface,
    the base further including a tip-over prevention member that is disposed in a switchable manner between a state where the tip-over prevention member at least protrudes forward from the mounting surface section in a moving direction when a relocating process is performed and a state where the tip-over prevention member does not protrude forward from the mounting surface section,
    the mounting surface section includes a raised portion extending upward from a center thereof, and accommodates the friction reducing mechanism in a space inside the raised portion, and
    the friction reducing mechanism is not connected to the tip-over prevention member.

2. The robot according to claim 1, wherein the tip-over prevention member is detachable.

3. The robot according to claim 1,
    wherein the friction reducing mechanism is a wheel rotated about a horizontal axis.

4. The robot according to claim 3, further comprising:
    a rotation detector that detects rotation of the wheel;
    an actuation detector that detects whether or not the tip-over prevention member is in a protruding state; and
    a notifier that gives an alarm when rotation of the wheel is detected by the rotation detector in a state where the protruding state of the tip-over prevention member is not detected by the actuation detector.

5. The robot according to claim 1, wherein the tip-over prevention member comprises a flat plate member that extends outward beyond an outermost of the mounting surface section in a state where the tip-over prevention member is protruding forward.

6. The robot according to claim 1, wherein the base includes a piller extending orthogonally upward from a center of the raised portion, and the movable unit is supported at an upper end of the piller.

* * * * *